United States Patent Office 3,847,948
Patented Nov. 12, 1974

3,847,948
PROCESS FOR THE PREPARATION OF NOVEL
DIHYDROXY-1,4-DIOXANES
Nobuo Yamamoto, Minami-Ashigara-machi, Japan, assignor to Fuji Photo Film Co., Ltd., Kanagawa, Japan
No Drawing. Continuation-in-part of abandoned application Ser. No. 850,673, Aug. 15, 1968. This application June 4, 1971, Ser. No. 150,164
Claims priority, application Japan, Aug. 17, 1968, 43/58,799
Int. Cl. C07d 15/12, 15/18
U.S. Cl. 260—340.3                                    15 Claims

ABSTRACT OF THE DISCLOSURE

Dihydroxy-1,4-dioxane derivatives represented by the following formula

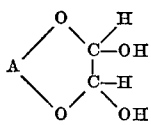

wherein A represents

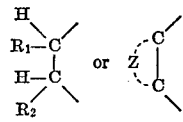

and wherein $R_1$ represents a hydrogen atom, an alkyl group, a haloalkyl group, an alkoxyalkyl group, an aryl group or an aryloxyalkyl group; $R_2$ represents an alkyl group, a haloalkyl group, an alkoxyalkyl group, an aryl group or an aryloxyalkyl group; and Z represents a non-metallic atomic group necessary to form a substituted or non-substituted unsaturated carbon ring; and a process for preparing such compounds comprising reacting a dihydroxy compound represented by the formula

HO—A—OH wherein A is the same as defined above, with glyoxal and recovering the dihydroxy-1,4-dioxane derivative, is disclosed.

CROSS-REFERENCE TO RELATED APPLICATION

This application is a continuation-in-part of U.S. application Ser. No. 850,673, filed Aug. 15, 1968, entitled "Process for Hardening Gelatin," now abandoned.

BACKGROUND OF THE INVENTION

Field of the Invention

This invention relates to novel dihydroxy-1,4-dioxane derivatives and a process for preparing the same.

Description of the Prior Art

The dihydroxy-1,4-dioxane derivatives represented by the above formula have not been known heretofore. These compounds possess interesting properties with respect to the chemical modifying of high-molecular-weight substances having active groups such as amino and hydroxyl groups.

Heretofore, 2,3-dihydroxy-1,4-dioxane corresponding to the above formula when both $R_1$ and $R_2$ represents a hydrogen atom, has been known as a gelatin-hardener for use in the production of photographic sensitive materials (see, e.g., U.S. Pat. No. 2,870,013), but has been found unsatisfactory for a number of reasons. 2,3-dihydroxy-1,4-dioxane, depending upon some photographic emulsions, adversely affects the characteristics of photographic sensitive materials, causing such disadvantages as an increase in fog of the photographic emulsions, a decrease in sensitivity and the occurrence of "post-hardening" due to its slow hardening reaction with the gelatin contained in the photograph sensitive material. Difficulties are encountered in attempting to improve the mechanical strength, such as the resistance to abrasion of a gelatin-containing layer of the photographic sensitive material, although the compound could increase its resistance to water.

In addition, British Pat. No. 926,313 discloses a method of hardening gelatin by incorporating therein an addition compound obtained by reacting at least 2 moles of glyoxal with one mole of a saturated or unsaturated aliphatic compound having in its molecule an —OH group separated by a chain of at least two carbon atoms from either another —OH group or an —NH$_2$ or —NH group.

The present inventor's extensive work has led to a successful synthesis of novel dihydroxy-1,4-dioxane derivatives expressed by the above formula, and it has been found that when used as hardeners for photographic sensitive materials, these compounds suffer far less from the above-mentioned defects than the known compound 2,3-dihydroxy-1,4-dioxane.

Accordingly, a principal object of this invention is to provide novel dihydroxy-1,4-dioxane derivatives expressed by the above formula and a process for producing the same.

Additional objects and advantages will become apparent from the following description.

SUMMARY OF THE INVENTION

The present invention provides novel dihydroxy-1,4-dioxane compounds of the formula:

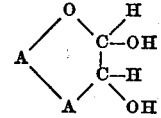

wherein A represents

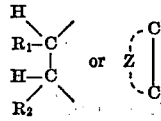

where $R_1$ represents a hydrogen atom, an alkyl group, a haloalkyl group, a haloalkyl group, an alkoxyalkyl group, an aryl group or an aryloxyalkyl group; $R_2$ represents an alkyl group, a haloalkyl group, an alkoxyalkyl group, an aryl group or an aryloxyalkyl group; and Z represents a non-metallic atomic group necessary to form a substituted or unsubstituted unsaturated carbon ring.

The present invention also provides a process for preparing such dihydroxy-1,4-dioxane compounds comprising reacting a dihydroxy compound represented by the following formula:

HO—A—OH wherein A has the same meaning as above defined, with glyoxal.

Specific compound are described in the following description.

DESCRIPTION OF THE PREFERRED EMBODIMENTS

Specific examples of the compounds of the present invention are as follows:

Compound (1)

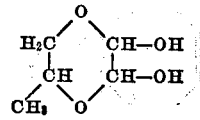

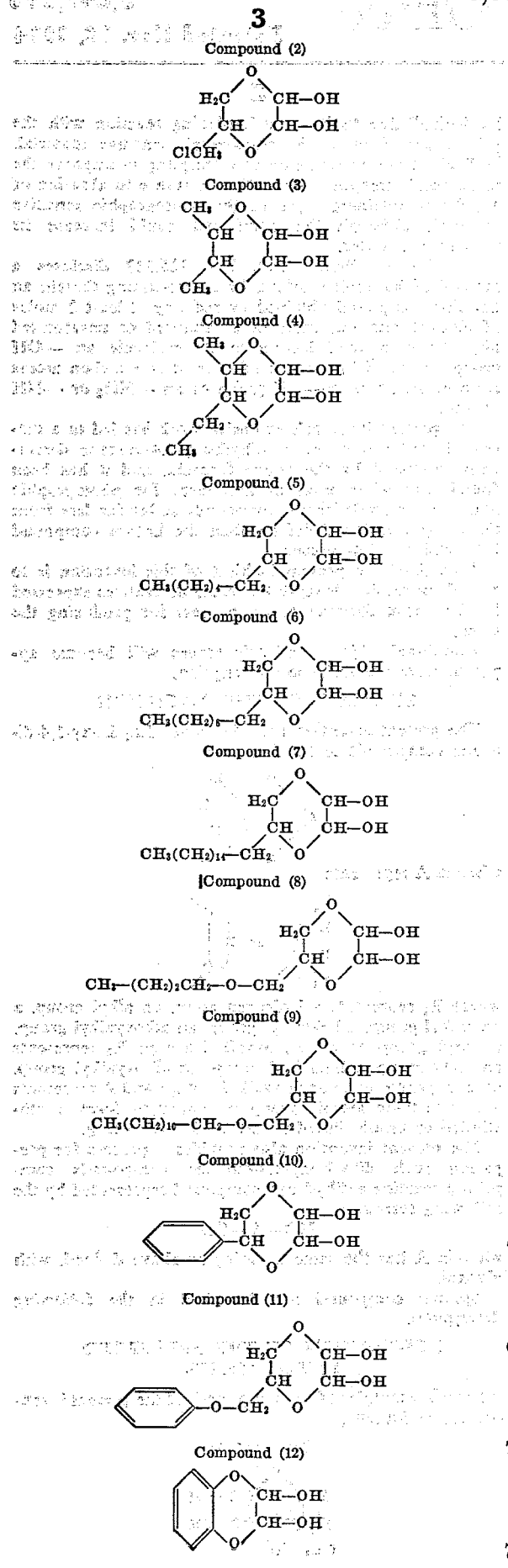

It is to be understood that the above compounds are only examples of the compounds of the present invention, and one of ordinary skill in the art should be able to formulate additional compounds not specifically mentioned but within the description in this application.

More specifically defining $R_1$ and $R_2$, the alkyl, alkoxyalkyl and haloalkyl groups may each contain from 1 to about 18 carbon atoms; the aryl group includes groups such as phenyl and the like; and the term "aryloxyalkyl" includes groups such as phenoxy-alkyl having from about 7 to about 18 carbon atoms.

The unsaturated carbon ring attached to the oxygen-containing ring, i.e., the ring including "Z," may contain from about 4 to about 8 carbon atoms wherein the substituents on the unsaturated ring may be alkyl groups having from 1 to about 5 carbon atoms.

Other groups not specifically enumerated above but included within the terms alkyl, haloalkyl, alkoxyalkyl, aryl and aryloxyalkyl are deemed to be within the scope of the present invention.

The process of the present invention generally comprises reacting a dihydroxy compound with glyoxal.

Stated more specifically, the dihydroxy - 1,4 - dioxane compounds of the present invention are prepared either by mixing the above-identified dihydroxy compound with an aqueous solution of glyoxal and allowing the mixture to stand at room temperature, or by reacting the dihydroxy compound with an aqueous solution of glyoxal on a desiccant such as phosphorus pentoxide or an alkali metal hydroxide at normal atmospheric pressure or at reduced pressure. The desiccant is not a reactant and does not add to the reaction mixture, and hence, any suitable desiccant can be employed, with a person or ordinary skill in the art being able to select appropriate desiccants by either trial and error or some other minimum amount of experimentation.

Typical examples of the dihydroxy compound which may be employed in the present process include the following: 3-chloro-1,2-propanediol, 1,2-octadecanediol, 1,2-propanediol, 2,3-butanediol, 2,3-pentanediol, 1,2-octanediol, 1,2-dodecanediol, 3-n-butoxy-1, 2-propanediol, 3-n-dodecyloxy - 1,2 - propanediol, 2-phenyl-1,2-ethanediol, 3-phenoxy-1,2-propanediol, catechol, and 4-tert.-butyl catechol.

From 0.8 to 1.2 moles of the dihydroxy compound are reacted with each mole of glyoxal to produce the compounds of the present invention, with a 1/1 molar ratio being preferred.

The reduced pressure may vary as desired and need not be limited to a specific range; however, a reduced pressure of from about 500 to about 0.01 mm. Hg is satisfactory with from about 300 to about 0.01 mm. Hg being preferred.

The terminology "room temperature" generally includes temperatures of from about 10 to about 40° C.

The reaction time is not to be limited, but it is generally that time necessary to substantially complete solidification of the mixture. It will be understood by those skilled in the art that the time may vary depending on the reactivity of the reactants, the properties of the desiccant employed and the reaction pressure, etc. Generally, however, the reaction time varies from about 1 to about 20 days.

The preparation of the compounds of the present invention will be more specifically illustrated by the following examples which are not intended to be limiting in any way.

EXAMPLE 1

Preparation of compound (2)

A mixture of 55.3 grams of 3-chloro-1,2-propanediol and 72 grams of a 40% aqueous solution of glyoxal was maintained under vacuum on phosphorus pentoxide until it was almost solidified. With the addition of a small amount of acetone, the resulting solidified mixture was filtered to yield 90 grams of a white crystal. Recrystallization of this crude crystal from 120 ml. of acetone produced 72 grams of compound (2) in a pure form. The product was found to have a melting point of 97–99° C. The elemental analysis of the product revealed the following result.

Calculated for $C_5H_9ClO_4$: C, 35.61%; H, 5.34%. Found: C, 35.76%; H, 5.47%.

The foregoing procedure will be referred to as procedure A (i.e., the use of a desiccant).

EXAMPLE 2

Preparation of compound (7)

14.3 grams of 1,2-octadecanediol, which by nature is difficulty soluble in water, was dissolved into 80 ml. of dioxane, and 7.7 grams of a 38% aqueous solution of glyoxal was added. The resulting mixture was allowed to stand for two days at room temperature. The precipitated white crystal was recovered by filtration, and recrystallized twice from acetone thereby to yield 9.5 grams of compound (7) which was found to have a melting point of 90–90.5° C. The elemental analysis of the product revealed the following result:

Calculated for $C_{20}H_{40}O_4$: C, 69.77; H, 11.63%. Found: C, 69.99%; H, 11.97%.

The foregoing procedure will be referred to as procedure B.

EXAMPLE 3

Preparation of compounds (1), (3)–(6) and (8)–(13)

Each of these compounds was prepared by procedure A or procedure B, described in Example 1 or Example 2 respectively. The hydroxy compounds used, the operational procedures employed and the physical properties of the resulting compounds are shown in Table 1.

pound (5) and compound (10), in the amount indicated in Table 2, were each added to a photographic emulsion containing 75 grams of gelatin and 60 grams of silver bromide per kilogram of the emulsion. Specimens were prepared by uniformly applying the resulting mixture to a cellulose triacetate film based to an extent such that the thickness of the emulsion layer after drying was 10μ, and thereafter drying the resulting film. One group of the specimens was aged at room temperature for three days, another group for 7 days, and still another group for 14 days. With respect to each of these specimens, the temperature at which the emulsion layer melted (melting point) was measured in a 2% aqueous solution of $$Na_2CO_3 \cdot H_2O$$

whose temperature was increased at a rate of 1° C. per minute. On the other hand, dry specimens which had been aged for two days under the accelerating conditions described in Table 2 were subjected to a dry scratch-resistivity test, and the melting point thereof was determined under the same conditions. A needle fitted at its tip with a diamond ball having a radius of 0.05 mm. was pressed against the surface of the emulsion layer at right angles thereto, and moved in a parallel manner on the surface thereof at a rate of 5 mm. per second. The load of the needle under which injury occurred to the emulsion layer was measured, and termed the "dry scratch-resisting strength." The results are shown in Table 2.

Furthermore, specimens which had been allowed to stand for 30 days at room temperature were each exposed by using an NSG–II type sensitometer, and developed for 10 minutes at 20° C., with a developer of the following composition:

|  | Grams |
|---|---|
| N-methyl p-aminophenol-sulfate | 1.0 |
| Sodium sulfite (anhydrous) | 75.0 |
| Hydroquinone | 9.0 |
| Sodium carbonate monohydrate | 30.0 |
| Potassium bromide | 5.0 |
| Water to make, 1 liter. | |

TABLE 1

| Dihydroxy compound used | Procedure | Compound No. | Melting point (° C.) | Recrystallization solvent | Yield (percent) | C (percent) Found | C (percent) Calculated | H (percent) Found | H (percent) Calculated |
|---|---|---|---|---|---|---|---|---|---|
| 1,2-propanediol | A | (1) | 100–101.5 | Acetone | 56 | 44.96 | 44.78 | 7.72 | 7.46 |
| 2,3-butanediol | A | (3) | Wax | | 70 | 48.28 | 48.65 | 7.85 | 8.11 |
| 2,3-pentanediol | A | (4) | Syrupy liquid | | 65 | 51.38 | 51.85 | 8.42 | 8.64 |
| 1,2-octanediol | A | (5) | 96–97 | Ethanol | 68 | 58.70 | 58.82 | 10.01 | 9.80 |
| 1,2-dodecanediol | B | (6) | 104–104.5 | Acetone | 62 | 64.38 | 64.62 | 10.71 | 10.77 |
| 3-n-butoxy-1,2-propanediol | A | (8) | Syrupy liquid | | 65 | 52.15 | 52.38 | 8.91 | 8.73 |
| 3-n-dodecyloxy-1,2-propanediol | A | (9) | 80–82 | Acetone | 33 | 63.80 | 64.15 | 10.81 | 10.69 |
| 2-phenyl-1,2-ethanediol | B | (10) | 146.5 | Ethanol | 47 | 61.12 | 61.22 | 5.90 | 6.12 |
| 3-phenoxy-1,2-propanediol | A | (11) | 125–125.5 | Acetone | 57 | 58.40 | 58.41 | 6.13 | 6.19 |
| Catechol | A | (12) | 136–136.5 | Water | 44 | 57.03 | 57.14 | 4.68 | 4.76 |
| 4-tert.-butyl catechol | B | (13) | 114–116 | Benzene | 51 | 64.27 | 64.29 | 7.38 | 7.14 |

The compounds of the present invention, prepared in accordance with the process of the present invention, exhibit better properties than the known compound 2,3-dihydroxy-1,4-dioxane when used as hardeners for photographic materials. They do not cause "post-hardening" and do not adversely affect the photographic materials. In addition, these compounds increase the mechanical strength of a gelatin-containing layer of photographic materials. One example of the advantages of the compounds of the present invention will be illustrated below.

EXAMPLE 4

The known compound 2,3-dihydroxy-1,4-dioxane, com-

After fixing and rinsing in water, the photographic properties of the specimens were measured. The results are shown in Table 3.

It will be appreciated from the results shown in Table 2 that specimen Nos. 4 to 7, containing the compounds of the present invention, exhibited a more rapid hardening and a higher resistance to injury in a dry condition than specimen No. 1 containing no such compound and specimen Nos. 2 and 3 containing the known analogous compound. Furthermore, specimen Nos. 4 to 7 hardly gave adverse effects to the photographic properties as shown in Table 3.

TABLE 2

| Specimen No. | Compound as hardener | Amount added (mol/kg.) | Melting point (° C.) Room temperature 3 days | 7 days | 14 days | Accelerating conditions (50° C., 80% RH, 2 days) | Dry scratch-resisting strength (grams) |
|---|---|---|---|---|---|---|---|
| 1 | None (control) | 0 | 35 | 35 | 35 | 36 | 25 |
| 2 | 2,3-dihydroxy-1,4-dioxane | 10⁻³ | 39 | 45 | 50 | 57 | 25 |
| 3 | do | 3×10⁻³ | 41 | 49 | 59 | 70 | 25 |
| 4 | Compound (5) | 10⁻³ | 45 | 56 | 58 | 59 | 90 |
| 5 | do | 3×10⁻³ | 55 | 68 | 70 | 71 | 90 |
| 6 | Compound (10) | 10⁻³ | 47 | 60 | 61 | 63 | 80 |
| 7 | do | 3×10⁻³ | 58 | 75 | 75 | 76 | 80 |

TABLE 3

| Specimen No. | Relative sensitivity | Gamma | Fog |
|---|---|---|---|
| 1 | 100 | 2.23 | 0.10 |
| 2 | 95 | 2.00 | 0.09 |
| 3 | 91 | 1.96 | 0.08 |
| 4 | 96 | 2.05 | 0.08 |
| 5 | 94 | 1.98 | 0.08 |
| 6 | 98 | 2.10 | 0.08 |
| 7 | 96 | 2.05 | 0.07 |

EXAMPLE 5

To seven separate photographic emulsions, each containing 75 grams of gelatin and 62 grams of silver iodobromide, were added various hardener compounds as shown in Table 4 below in the amounts shown in Table 4. Each emulsion was applied separately to a subbed cellulose triacetate film in such an amount as to provide a dry coating film thickness of 10 microns and then dried to form specimens, the melting points and dry scratch-resisting strength were measured as described above. In addition, the "wet scratch-resisting strength" of the specimens subjected to the accelerated conditions was determined by soaking the specimens in a 2% aqueou solution of $Na_2CO_3 \cdot H_2O$ and then performing the same operations as employed in measuring the dry scratch-resisting strength. The results are shown in Table 4.

TABLE 4

| Specimen No. | Compound hardener | Amount (mole/kg.) | Melting point (° C.) Room temperature 3 days | 7 days | 14 days | Accelerated | Scratch-resisting strength (grams) Dry drying conditions | Wet |
|---|---|---|---|---|---|---|---|---|
| 1 | None | 0 | 35 | 35 | 35 | 35 | 25 | 13 |
| 2 | 2,3-dihydroxy-1,4-dioxane | 2×10⁻³ | 39 | 45 | 55 | 60 | 25 | 95 |
| 3 | do | 2×10⁻³ | 45 | 55 | 64 | 68 | 27 | 105 |
| 4 | (1) | 2×10⁻³ | 42 | 54 | 62 | 65 | 45 | 115 |
| 5 | (1) | 4×10⁻³ | 55 | 69 | 73 | 75 | 50 | 130 |
| 6 | (3) | 2×10⁻³ | 42 | 59 | 66 | 68 | 60 | 120 |
| 7 | (3) | 4×10⁻³ | 55 | 70 | 74 | 77 | 60 | 150 |

What is claimed is:

1. A dihydroxy-1,4-dioxane compound represented by the following formula:

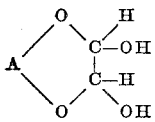

wherein A represents

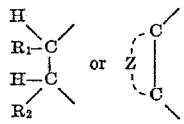

and wherein $R_1$ represents hydrogen, alkyl of from 1 to 18 carbon atoms, monohaloalkyl of from 1 to 8 carbon atoms, alkoxyalkyl having a total number of from 2 to 13 carbon atoms, phenyl or phenoxyalkyl having a total number of from 7 to 18 carbon atoms; $R_2$ represents alkyl of from 1 to 18 carbon atoms, monohaloalkyl of from 1 to 8 carbon atoms, alkoxyalkyl having a total number of from 2 to 13 carbon atoms, phenyl or phenoxyalkyl having a total number of from 7 to 18 carbon atoms; and Z represents carbon-to-carbon chain of 4 carbon atoms to form a non-substituted or mono-substituted aromatic carbon ring of 6 carbon atoms, the substituent on said ring being alkyl of from 1 to 5 carbon atoms.

2. The compound of Claim 1 wherein monohaloalkyl is monohalomethyl.

3. The dihydroxy-1,4-dioxane compound of Claim 1:

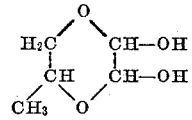

4. The dihydroxy-1,4-dioxane compound of Claim 1:

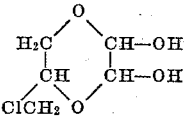

5. The dihydroxy-1,4-dioxane compound of Claim 1:

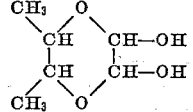

6. The dihydroxy-1,4-dioxane compound of Claim 1:

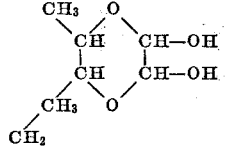

7. The dihydroxy-1,4-dioxane compound of Claim 1:

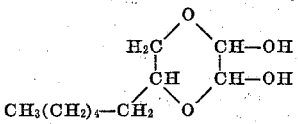

8. The dihydroxy-1,4-dioxane compound of Claim 1:

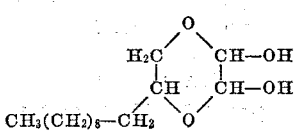

9. The dihydroxy-1,4-dioxane compound of Claim 1:

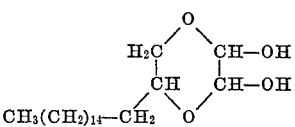

10. The dihydroxy-1,4-dioxane compound of Claim 1:

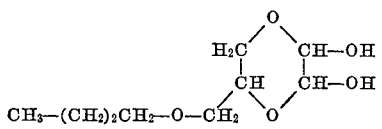

11. The dihydroxy-1,4-dioxane compound of Claim 1:

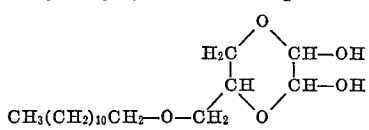

12. The dihydroxy-1,4-dioxane compound of Claim 1:

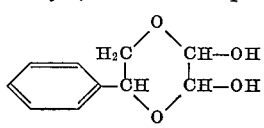

13. The dihydroxy-1,4-dioxane compound of Claim 1:

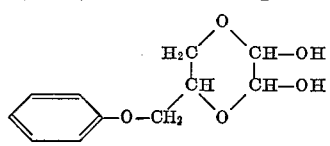

14. The dihydroxy-1,4-dioxane compound of Claim 1:

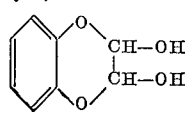

15. The dihydroxy-1,4-dioxane compound of Claim 1:

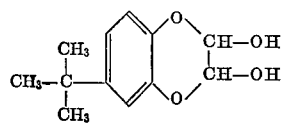

References Cited

UNITED STATES PATENTS 2,361,456   10/1944   Chitwood _____ 260—340.6

OTHER REFERENCES

Head: "Chemical Abstracts," vol. 50, 1956, col. 1822g.
Horton et al.: "Chemical Abstracts," vol. 59, 1963, cols. 3466h–3467b.
Head: "Chemical Abstracts," vol. 55, 1961, col. 9425f.
Jeffreys et al.: "Chemical Abstracts," vol. 71, 1969, col. 66038r.

DONALD G. DAUS, Primary Examiner

J. H. TURNIPSEED, Assistant Examiner

U.S. Cl. X.R.

96—111; 117—34; 260—340.6